United States Patent [19]

Howard, Jr.

[11] 4,183,554
[45] Jan. 15, 1980

[54] SEMI-LAMINATED SECURITY POUCH
[75] Inventor: Crit Howard, Jr., Addison, Ill.
[73] Assignee: General Binding Corporation, Northbrook, Ill.
[21] Appl. No.: 872,442
[22] Filed: Jan. 26, 1978
[51] Int. Cl.$^2$ ............................ G09F 3/03; G09F 3/04
[52] U.S. Cl. ......................................... 283/7; 40/2.2; 428/13; 427/7
[58] Field of Search ..................... 283/6, 7, 8 R, 8 B; 427/7; 229/83; 428/13; 40/2.2

[56] References Cited

U.S. PATENT DOCUMENTS

| | | | |
|---|---|---|---|
| 3,417,497 | 12/1968 | Hannon | 283/7 X |
| 3,566,521 | 3/1971 | Conner | 283/7 X |
| 3,802,724 | 4/1974 | Gosnell | 427/7 X |
| 4,101,701 | 7/1978 | Gordon | 283/7 X |

FOREIGN PATENT DOCUMENTS

| | | | |
|---|---|---|---|
| 1185066 | 3/1970 | United Kingdom | 283/6 |
| 1269514 | 4/1972 | United Kingdom | 283/7 |

*Primary Examiner*—Robert L. Spicer, Jr.
*Attorney, Agent, or Firm*—Hill, Van Santen, Steadman, Chiara & Simpson

[57] ABSTRACT

A semi-laminated security pouch for a tamper proof identification card is disclosed. The identification card to be protected by the security pouch has a glass bead security coating on a front face which provides an indication if indicia are tampered with on the face of the card. The pouch comprises front and rear film leaves with a heat reactivatable adhesive layer on the rear leaf card-facing surface. The rear surface of the card is centered against the rear leaf for lamination. The front leaf does not have a heat reactivatable adhesive layer thereon since such a layer would destroy the retroreflective visual characteristics of the glass bead security coating. The front leaf card-facing surface does, however, have the bond promoting coating thereon such that when the pouch is assembled, peripheral portions of the front leaf come in contact with peripheral portions of the rear leaf extending beyond the card edges. The bond promoting coating permits adhesion between the polyester material front leaf and the heat reactivatable adhesive at peripheral portions of the rear leaf.

9 Claims, 4 Drawing Figures

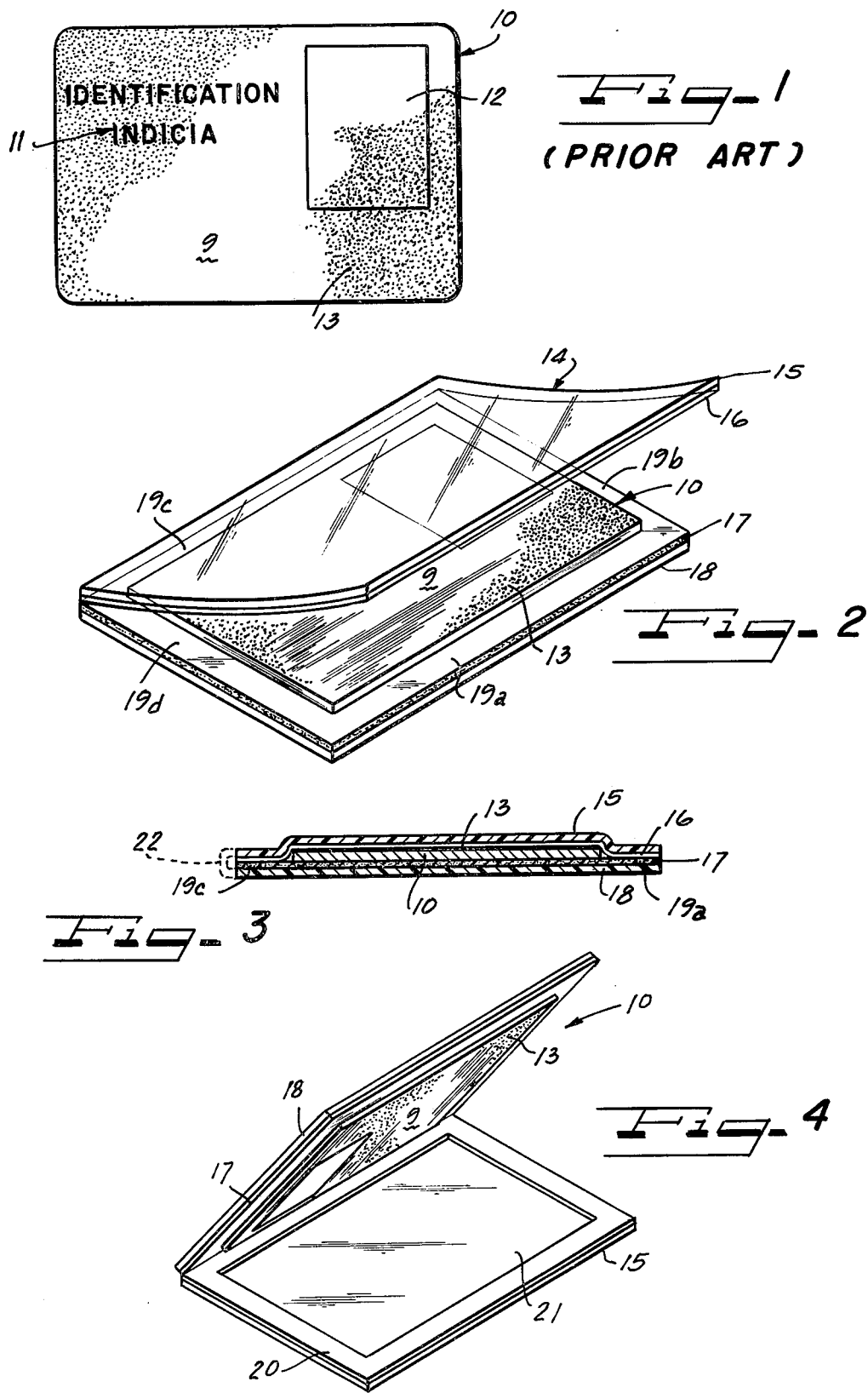

SEMI-LAMINATED SECURITY POUCH

BACKGROUND OF THE INVENTION

1. Field of the Invention

The invention relates to laminated security pouches for identification cards.

2. Description of the Prior Art

The 3M Corporation has developed a new identification card, trademarked "Datagard", whose front surface contains tiny glass beads. When illuminated and viewed in a particular device, a hidden pattern is revealed, thus revealing the card's authenticity. Attempts to alter the photograph or indicia are revealed as displacements of individual beads attached to a resilient matrix bearing varying colors. The card front surface containing the glass bead coating must not be laminated because in doing so the visual phenomena provided by the retroreflective beaded surface is negated. This results since thermoplastic heat reactivatable adhesives encapsulate the glass lenticular beads.

The use of polyester laminating films in the construction of film pouches for identification cards is known. With such pouches, the front and back leaves of the pouch are laminated to the respective front and back surfaces of the identification card. As noted above, such a technique would destroy the retroflective characteristics of an identification card having a glass bead security coating thereon.

SUMMARY OF THE INVENTION

It is an object of this invention to provide an identification card assembly having an improved semi-laminating security pouch wherein an identification card can be protected from the environment but without destroying the visual characteristics of a glass bead security coating on the face of the card.

According to the invention, a semi-laminated security pouch is provided having transparent front and rear polyester film leaves. The heat reactivatable adhesive layer is arranged on a card facing surface of the rear leaf so that the rear leaf may be laminated to a rear surface of the card. The card is substantially centered on the rear leaf so that peripheral portions of the rear leaf may come in contact with peripheral portions of the front leaf. A glass bead security coating on a front face of the card is not disturbed by the front leaf since the front leaf does not have heat reactivatable adhesive thereon. Rather, the front leaf has at least in its peripheral portions a bond promoting layer which promotes an integral bond between peripheral portions of the front leaf and peripheral portions of the rear leaf containing the heat reactivatable adhesive. The bond promoting layer is necessary to ensure a secure contact between polyester film and heat reactivatable adhesive. Without the bond promoting layer, heat reactivatable adhesive will not bond well to polyester film. With the protected card assembly of this invention, the card has substantial physical protection against the environment and yet retains its security feature.

The heat reactivatable adhesive may preferably be a copolymer adhesive such as that described in U.S. Pat. No. 3,711,355.

The bond promoting coating may comprise various compounds well known in the art under the term "Tie coatings". Such tie coatings are well known for adhering heat reactivatable adhesive coatings to polyester.

BRIEF DESCRIPTION OF THE DRAWINGS

FIG. 1 is a front view of an identification card having a glass bead security coating on a front face thereof;

FIG. 2 is a perspective view of a semi-laminating security pouch utilized with the identification card of FIG. 1;

FIG. 3 is a cross-sectional view taken along lines III—III of FIG. 2; and

FIG. 4 is a perspective view of an alternate embodiment of the security pouch of FIG. 2.

DESCRIPTION OF THE PREFERRED EMBODIMENTS

An identification card to be protected is generally shown at 10 in FIG. 1. This identification card has identification indicia 11 and typically a photograph 12 on a front face 9 thereof. A glass bead security coating 13 known under the trademark "Datagard" of the 3M Corporation is applied across the front face of a card. If one attempts to alter the photograph or identifying indicia, the glass beads are disturbed and displacements of the individual beads are revealed by visual observations of the retroreflective beaded surface.

As shown in FIG. 2, the semi-laminated security pouch 14 of this invention has a front leaf 15 comprised of a transparent polyester film. A bond promoting layer 16 as previously described is applied to a card facing surface of the front leaf 15. A rear transparent polyester film leaf 18 has a heat reactivatable adhesive layer 17 applied over its card-facing surface. With the card 10 centered on the rear leaf 18 and heat reactivatable adhesive 17, peripheral surface portions 19a, 19b, 19c and 19d of the rear film leaf 18 and heat reactivatable adhesive layer 17 are exposed for contact with corresponding peripheral surface portions on the card facing surface of the front leaf 15.

The bond promoting layer 16 covering the card-facing surface of the front leaf 15 permits sealing of the peripheral portions of the adhesive layer 17 to the corresponding peripheral portions of the polyester front leaf 15.

As shown in FIG. 3, the completed assembly forms a sandwhich wherein the identification card 10 is protected within a pocket of the sandwich. The rear surface of the identification card 10 is laminated whereas the front face of the card is not laminated. Also as shown in dotted lines at 22 in FIG. 3, the front and rear leaves 15 and 18 may be connected by a fold 22 or may constitute separate leaves.

As shown in FIG. 4 (in reverse position), in an alternate embodiment of the invention a bond promoting layer 20 may be provided only at peripheral portions on the card-facing surface of the front leaf 15 such that an untreated surface area 21 which substantially corresponds to the area of the identification card 10 results. Since the bond promoting layer is not used to bond the front leaf 15 to the front face 9 of the card 10, there is no need to provide the bond promoting layer at contact areas between the front face 9 and the untreated area 21.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A semi-laminated tamper proof identification card assembly, comprising:
   (a) an identification card having identifying indicia on a front face and a glass bead security coating means on said front face for providing data alteration security which becomes substantially ineffective when a heat reactivatable adhesive layer is melted in contact therewith:
   (b) transparent front and rear film leaves;
   (c) a heat reactivatable adhesive layer on said rear leaf laminating the rear leaf to a rear surface of the card; and
   (d) the front leaf being positioned over and in contact with but not laminated to the security coating means on the card and said front leaf not having a heat reactivatable adhesive layer in contact with the security coating means, said front leaf being bonded to the rear leaf by said heat reactivatable adhesive at peripheral portions of the front leaf substantially surrounding outer edges of the card, a bond promoting means being provided for adhering the front leaf peripheral portions to the heat reactivatable adhesive.

2. A semi-laminated tamper proof identification card assembly comprising:
   (a) an identification card having identifying indicia on a front face and a glass bead security coating means on said front face for providing data-alteration security, the coating means losing its data-alteration security when laminated thereover with a heat reactivatable adhesive layer;
   (b) transparent polyester front and rear film leaves, said card being between the leaves;
   (c) a heat reactivatable adhesive layer on a card facing surface of the rear leaf but not on portions of the front leaf adjacent the security coating means;
   (d) the front and rear leaves each having a peripheral portion which extends beyond and at least partially surrounds the identification card when the card is on the leaves; and
   (e) a bond promoting layer means for improving adhesion of a card facing surface of the polyester front leaf to the heat reactivatable adhesive layer of the rear leaf, the layer means being provided at least on the peripheral portion of the front leaf.

3. The assembly of claim 2 in which the bond promoting layer means substantially covers the card facing surface of the front leaf.

4. The assembly of claim 2 in which the peripheral portion of the leaves completely surrounds the card and the card facing surface of the peripheral portion of the front leaf is completely covered with the bond promoting layer means.

5. The assembly of claim 2 in which the front and back leaves are joined to one another at a fold line.

6. The assembly of claim 2 in which the glass bead security coating means provides a retroreflective visual effect which is altered when indicia on the card is tampered with, and a lamination with heat reactivatable adhesive over the coating substantially altering the retroreflective visual effect as the adhesive encapsulates the glass beads.

7. The assembly of claim 2 in which the card comprises paper material.

8. The assembly of claim 2 in which the card comprises plastic material.

9. A semi-laminating security pouch for an identification card having identifying indicia on a front face and a glass bead security coating on said front face which is rendered ineffective when coated by a heat reactivatable adhesive layer, comprising:
   (a) a front transparent polyester film leaf;
   (b) a rear transparent polyester film leaf;
   (c) a heat reactivatable adhesive layer on a card-facing surface of the rear leaf;
   (d) the front and rear leaves each having a peripheral portion which extends beyond and surrounds the identification card when the card is centered on the leaves; and
   (e) a bond promoting layer means on the peripheral portion at a card-facing surface of the first leaf, a heat reactivatable adhesive layer not being provided on a card-facing surface portion of the front leaf.

* * * * *